March 28, 1933. E. E. HANS 1,902,998
GAUGE
Filed Feb. 17, 1928
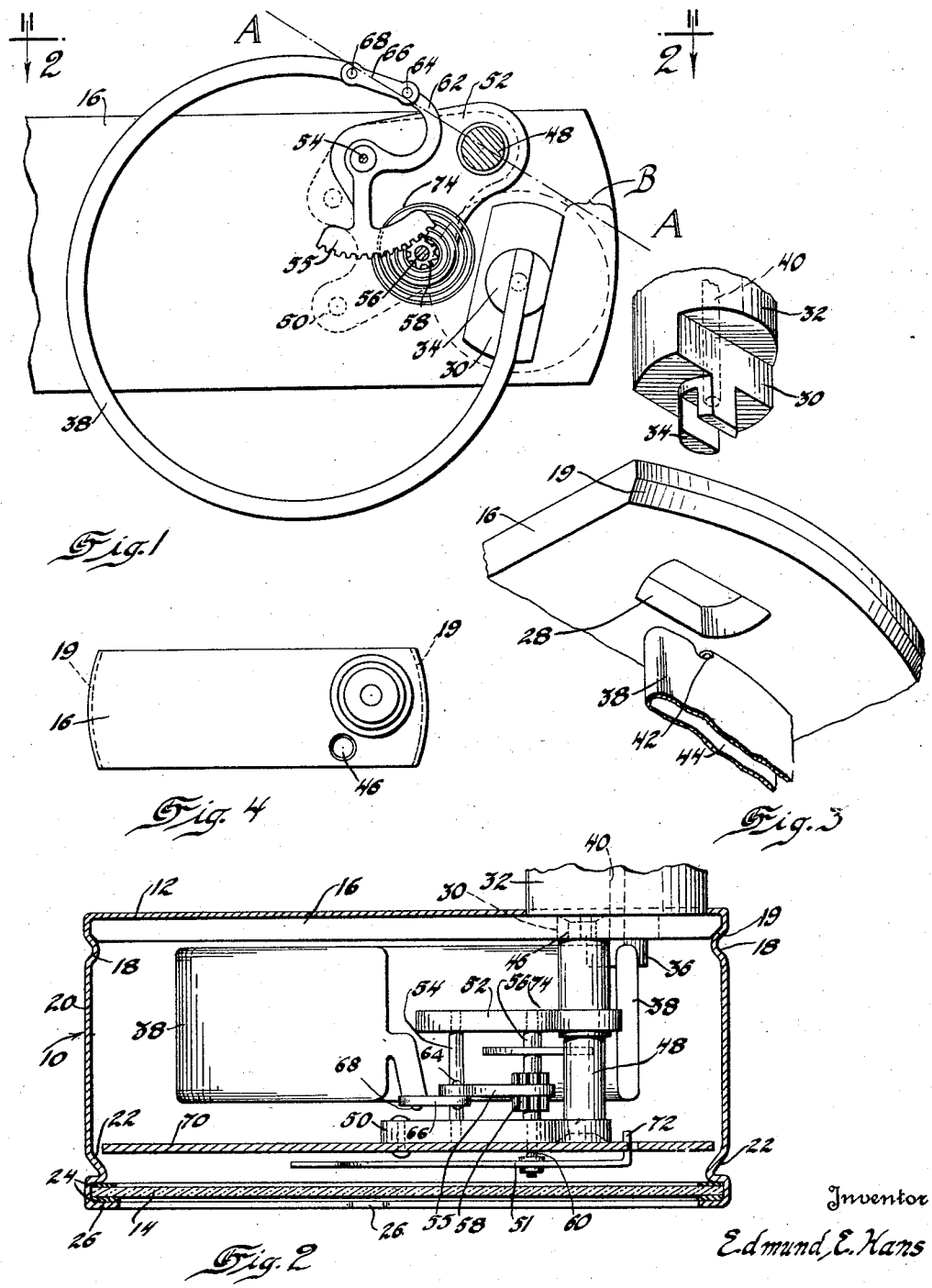
Inventor
Edmund E. Hans Patented Mar. 28, 1933

1,902,998

UNITED STATES PATENT OFFICE

EDMUND E. HANS, OF DETROIT, MICHIGAN, ASSIGNOR TO A C SPARK PLUG COMPANY, OF FLINT, MICHIGAN, A COMPANY OF MICHIGAN

GAUGE

Application filed February 17, 1928. Serial No. 255,060.

This invention relates to improvements in gauges and has particular reference to the type of gauge used in connection with automotive vehicles.

The gauge is of the Bourdon tube type, and has a number of features of novelty both with reference to the mechanism of the gauge itself, and with reference to the casing inclosing the recording mechanism.

In prior gauges of this type the inlet or stud to which the end of the Bourdon tube has been attached has extended well within the casing, and has overlapped the entire end of the tube. In the present invention only a small portion of the inlet or stud projects inwardly of the gauge and to this small projecting portion the end of the Bourdon tube is attached. This makes a more compact and less expensive structure, and eliminates the lengthy stem of the inlet.

The casing per se embodies a number of features, particularly with reference to the manner in which the front and back members are attached.

The front member or transparent face of the gauge is attached by bending over tongues or flanges which are formed as extensions of the side of the casing. A rib or a plurality of indentations pressed in the casing form a seat for the transparent or glass front.

The gauge mechanism is mounted on a base plate which rests against the bottom or rear side of the case and is held rigidly therein by a plurality of indentations pressed in the casing side. The base plate is also constructed so that it is provided with an excess amount of stock at its weaker points.

My novel gauge or pointer swinging mechanism has the line of movement of the link attached to the end of the Bourdon tube substantially in line with the supporting pillar for the mounting frame of the gauge mechanism. This relation eliminates the chance of the frame moving with reference to the pillar as such movement would affect the calibration of the gauge.

In the drawing:

Figure 1 is a plan view of the base of the gauge and the pointer moving mechanism, one frame member being shown in dotted lines.

Figure 2 is a side view of the mechanism in place in the gauge casing looking substantially along the plane of the line 2—2, of Figure 1.

Figure 3 is an expanded view showing the manner in which the Bourdon tube and inlet stud are attached.

Figure 4 is a view from the rear of the base plate and stud.

Referring to the drawing, the numeral 10 designates the casing for inclosing the mechanism of the gauge, which casing has a back 12 and a transparent face 14. The back or bottom 12 is integral with the casing sides and against this bottom portion there rests the base plate 16 which supports the gauge mechanism. The plate 16 is held in place by a plurality of indentations or buttons 18 pressed in the side 20 of the casing 10 against the bevelled edge 19 of the base 16. If desired, ribs instead of buttons may be used to hold the base plate.

By referring to Figures 1 and 3 it will be noted that the side of the stud 32 having the flat sided part 30 is what may be called off center as is clearly seen in Figure 1, the dotted circle representing the stud's outline. This off center construction gives an increased amount of stock between the edge or end of the base and the flat sided portion 30 as shown by the distance B, Figure 1. In the past it has been found that considerable breakage of the base member occurred by cracking at its weakest point or where there was the least amount of stock, due principally to the carelessness of workmen in applying the gauge. A wrench is frequently used and when the gauge is excessively tightened to its mounting, or given a twist by the wrench, the base member is often cracked and the efficiency of the instrument largely destroyed. This defect is obviated by allowing for a larger portion of metal between the flattened portion 30 and the end of the base.

By the use of the offset portion I am able to place the stud 32 closer to the edge of the mounting plate and thereby permit of the Bourdon tube being placed nearer to the edge. This will result in a permissible decreased overall length of the base plate and a corresponding decrease in the size of the gauge.

The front portion of the casing 10 is provided with a plurality of indentations 22 (or an annular inwardly bent bead or rib) to form a seat for the reception of the transparent or glass front 14. Gaskets or rings 24 are placed above and below the glass 14 and integral extensions or tongues 26 of the casing side 20 and of any suitable width are bent over the transparent face 14, as shown in Figure 2, to rigidly hold it in position. As many of these tongues as desired may be used but in practice I prefer four.

The mechanism of the gauge is mounted on a base plate 16 shown in detail in Figure 4. This base plate is held in position at the back or rear face 12 by means of the inwardly pressed portions 18 as has been previously described and has a substantially rectangular or flat sided opening 28 at one end for the reception of a correspondingly shaped flat sided portion 30 of the inlet or stud member 32. This stud member has a forked reduced portion 34 which projects a short way within the casing 10 as shown at 36, and to this forked portion there is attached the Bourdon tube 38 as shown at 36 in Figure 2. The inlet or stud 32 has a central bore 40 and when the stud and Bourdon tube 38 are secured together this bore 40 will coincide with the opening 42 in the Bourdon tube. When the parts are secured together in their fluid tight relation, the bore 40 will communicate with the hollow interior 44 of the Bourdon tube 38.

Mounted at 46 on the base plate 16 is a post 48 on which the pointer operating mechanism is mounted. In the drawing I have shown this post 48 as mounted toward one end of the base plate 16, although if desired it may be placed at the center. The pointer operating mechanism comprises the plates or subframe members 50 shown in dotted lines in Figure 1 and 52 rigidly mounted on the post 48 and between these plates there are journally or pivotally mounted the shafts or the posts 54 and 56. On the post 54 there is fixed the segment 55 meshing with a small gear 58 fixed on the post 56. The post 56 is reduced at one end and extends outwardly through the plate 50 as shown at 60, and on this extension 60 there is rigidly mounted the pointer 51. The segment 55 has an integral calibrating arm 62, preferably goose-neck shape and extending away therefrom as shown in Figure 1, and to this arm there is pivoted at 64 a link 66, the opposite end of which is pivoted at 68 to the free or movable end of the Bourdon tube 38. A coil spring 74 is used to take care of blacklash and to aid in returning the pointer to its initial position.

From an inspection of Figure 1, it will be seen that the line of action A—A of the link 66 attached to the end of the Bourdon tube is substantially on a straight line passing through the pivots 68 and 64, and the post 48. From this it will be evident that there will be little or no moment about the axis or center of the pillar and the possibility therefore of the frame 50—52 moving and in so doing affecting the gauge's calibration is substantially eliminated.

A dial 70 is secured to the plate 50 and this dial is provided with an arcuate slot (not shown) for the reception of a bent end 72 of the pointer 51. This slot has a length such that the ends thereof will limit the throw of the pointer 51 in conformity with the ends of the scale on the dial 70.

The operation of the gauge is as follows: To the threaded portion of the inlet or stud 32 there is secured a suitable pipe or other connection which will permit the transmission of heat or fluid pressure to the Bourdon tube. The expansion of the tube will cause a pull on the link 66 which pull will in turn be transmitted by the arm 62 to the segment 55, which will cause the rotation of the pinion 58 and its shaft 56 and thereby cause the pointer 51 to swing over the scale on the dial 70. In the initial position of the pointer 51 its hook end portion 72 will be at one extremity of the arcuate slot, while when the pointer reaches the opposite end of the scale the hook portion will be at the opposite end of the slot.

I claim:

1. In a gauge, a casing having a back, a base portion abutting thereagainst and adapted for supporting the gauge mechanism, and a plurality of indentations on said casing at said base portion to hold the same in position.

2. In a gauge having a pointer and a Bourdon tube, a base plate, a plurality of supporting plates supported from said base plate by a common mounting member, and means connected to said tube and mounted by said plates for operating said pointer, said means including a member having a substantially straight line motion on a line passing through the tube end and the mounting member.

3. In a gauge, a Bourdon tube, a pointer, a frame, means mounted on said frame and attached to the tube and pointer for causing the latter to swing in response to movements of the former, a member upon which said frame and means are mounted, said means comprising an element movable substantially in a path formed by a line passing through the end of the tube and the member.

4. In a gauge, a casing having a back, a base portion abutting thereagainst and adapted for supporting the gauge mechanism, a bevelled edge on said base, and a plurality of indentations on said casing at said base portion to hold the same in position, said indentations pressing rigidly against said bevelled edge.

5. In a gauge, a casing, a mounting plate in the back of the casing and having an opening, an inlet plug in said opening having a forked portion extending a short way through said opening, and a Bourdon tube secured at one edge in said forked portion.

6. In a gauge having a pointer and a Bourdon tube, a base plate, a plurality of supporting plates supported from said base plate by a common post mounted near the edge of the base plate, and means connected to said tube and mounted by said plates for operating said pointer, said means including a member having a substantially straight line motion on a line passing through the tube end and the post.

7. In a gauge, a casing, a base plate mounted in said casing, a hollow inlet plug secured to said plate, said plug having a portion projecting beyond said plate into said casing, and a Bourdon tube mounted at its end on said projecting portion, said projecting portion extending less than half way on the side of the tube.

8. In a gauge, a Bourdon tube, a casing, a base plate secured in the back of said casing, a hollow inlet plug projecting through the casing back and secured to said plate, said plug having a portion of less length than the width of said Bourdon tube and projecting a short distance beyond said plate into said casing, said Bourdon tube secured directly in said portion.

9. In a gauge, a mounting plate having an opening, an inlet plug in said opening having a portion extending a short distace therethrough, and an operating member laterally engaging with and directly secured to the end of said portion, said lateral engagement extending part way only over the side of said member.

10. In a gauge, a casing, a base plate in the back of said casing, a hollow inlet plug projecting through the casing back and secured to said plate, said plug having a portion projecting a short distance beyond said plate into said casing, and a Bourdon tube directly secured at its side to the end of said portion, said portion extending part way only over the side of said tube.

11. In a gauge, a mounting plate having an elongated opening near an edge, a supporting stud for a Bourdon tube in said opening, said stud having a portion to fit said elongated opening, said elongated opening and stud arrangement permitting a larger amount of metal stock to remain in the plate between the opening and the edge of the plate.

In testimony whereof I affix my signature.

EDMUND E. HANS.